US011035324B2

(12) United States Patent
Itoh et al.

(10) Patent No.: US 11,035,324 B2
(45) Date of Patent: Jun. 15, 2021

(54) VEHICLE

(71) Applicant: TOYOTA JIDOSHA KABUSHIKI KAISHA, Aichi-ken (JP)

(72) Inventors: Hisayuki Itoh, Toyota (JP); Koji Ichikawa, Aichi-ken (JP); Masaaki Yamaguchi, Okazaki (JP); Hirokazu Kato, Nisshin (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/996,902

(22) Filed: Aug. 19, 2020

(65) Prior Publication Data
US 2021/0115882 A1 Apr. 22, 2021

(30) Foreign Application Priority Data
Oct. 17, 2019 (JP) .............................. JP2019-190464

(51) Int. Cl.
*F02M 26/49* (2016.01)
*F02M 26/13* (2016.01)
(Continued)

(52) U.S. Cl.
CPC ......... *F02M 26/49* (2016.02); *F02D 41/0077* (2013.01); *F02D 41/042* (2013.01);
(Continued)

(58) Field of Classification Search
CPC ........ F02M 26/05; F02M 26/06; F02M 26/28; F02M 26/32; F02M 26/04; F02M 26/19; F02M 26/23; F02M 26/33; F02M 26/43; F02M 26/47; F02M 26/52; F02M 26/17; F02M 26/22; F02M 26/21; F02M 26/30; F02M 26/70; F02M 26/24; F02M 26/10; F02M 26/25; F02M 26/35; F02M 26/41; F02M 26/49; F02M 26/08; F02M 26/15;
(Continued)

(56) References Cited

U.S. PATENT DOCUMENTS

2008/0147294 A1* 6/2008 Tomatsuri ............. F02D 41/062
701/102
2013/0206105 A1* 8/2013 Ando ................... F02D 13/0215
123/348
(Continued)

FOREIGN PATENT DOCUMENTS

JP 2008151064 A 7/2008

*Primary Examiner* — Sizo B Vilakazi
(74) *Attorney, Agent, or Firm* — Hauptman Ham, LLP

(57) ABSTRACT

A vehicle including: an engine; an exhaust gas recirculation device including a communication pipe by which an exhaust pipe of the engine and an intake pipe of the engine communicating, and a valve that is provided in the communication pipe; and a control device configured to control the engine, to control the valve based on a target opening of the valve, to perform automatic stopping of the engine based on satisfaction of an automatic stopping condition, and to perform automatic starting of the engine based on satisfaction of an automatic starting condition. The control device is configured to prohibit automatic stopping of the engine when it is determined that foreign matter is caught in the valve through catching diagnosis which is diagnosis of whether foreign matter is caught in the valve.

12 Claims, 7 Drawing Sheets

(51) Int. Cl.
*F02M 35/10* (2006.01)
*F02D 41/04* (2006.01)
*F02D 41/06* (2006.01)
*F02D 41/00* (2006.01)

(52) U.S. Cl.
CPC ........... *F02D 41/062* (2013.01); *F02M 26/13* (2016.02); *F02M 35/10222* (2013.01); *F02D 2200/0406* (2013.01)

(58) Field of Classification Search
CPC ........ F02M 26/16; F02M 26/46; F02M 26/09; F02M 26/14; F02M 26/20; F02M 26/29; F02M 26/64; F02M 26/07; F02M 26/34; F02M 26/36; F02M 26/38; F02M 26/50; F02M 26/51; F02M 26/54; F02M 26/02; F02M 26/11; F02M 26/27; F02M 26/31; F02M 26/42; F02M 26/44; F02M 26/48; F02M 26/71; F02M 26/72; F02M 26/73; F02M 26/00; F02M 26/12; F02M 26/13; F02M 26/26; F02M 26/45; F02M 26/53; F02M 26/57; F02M 26/60; F02M 26/63; F02M 26/65; F02M 26/66
See application file for complete search history.

(56) References Cited

U.S. PATENT DOCUMENTS

| | | | |
|---|---|---|---|
| 2013/0312719 A1* | 11/2013 | Mikashima | F02D 41/0055 123/568.21 |
| 2013/0319383 A1* | 12/2013 | Yoshioka | F02D 41/123 123/568.21 |
| 2018/0106220 A1* | 4/2018 | Yoshioka | F16K 1/2021 |
| 2019/0195153 A1* | 6/2019 | Dudar | F02M 26/23 |

* cited by examiner

VEHICLE

INCORPORATION BY REFERENCE

The disclosure of Japanese Patent Application No. 2019-190464 filed on Oct. 17, 2019 including the specification, drawings and abstract is incorporated herein by reference in its entirety.

BACKGROUND

1. Technical Field

The disclosure relates to a vehicle.

2. Description of Related Art

A vehicle including, an engine, and an exhaust gas recirculation (EGR) device that includes an EGR pipe by which an exhaust pipe of the engine and an intake pipe of the engine communicating and an EGR valve provided in the EGR pipe, has been proposed (for example, see Japanese Unexamined Patent Application Publication No. 2008-151064 (JP 2008-151064 A). In such a vehicle, when an engine stop request is issued, the engine is caused to idle, operation of the EGR device is stopped, and a process of stopping the engine is performed when an amount of EGR gas remaining in the intake pipe which is estimated based on an amount of intake air is less than a predetermined value. In this way, deterioration in exhaust properties at the time of starting of the engine is curbed.

SUMMARY

In such a vehicle, when the engine is stopped in a state in which foreign matter is caught in the EGR valve and then the engine is started, EGR gas is unintentionally supplied to the intake pipe, combustion in the engine may not stabilize, and there is a likelihood that starting of the engine will fail.

The disclosure provides a vehicle that can prevent an engine from failing to start.

According to a first aspect of the disclosure, there is provided a vehicle including: an engine; an exhaust gas recirculation device including, a communication pipe by which an exhaust pipe of the engine and an intake pipe of the engine communicating, and a valve that is provided in the communication pipe; and a control device configured to control the engine, to control the valve based on a target opening of the valve, to perform automatic stopping of the engine based on satisfaction of an automatic stopping condition, and to perform automatic starting of the engine based on satisfaction of an automatic starting condition. The control device is configured to prohibit automatic stopping of the engine when it is determined that foreign matter is caught in the valve through a catching diagnosis which is a diagnosis of whether foreign matter is caught in the valve.

According to the first aspect, it is possible to prevent the engine from failing to start automatically the next time due to automatic stopping of the engine in a state in which foreign matter is caught in the valve.

According to a second aspect of the disclosure, there is provided a vehicle including: an engine; an exhaust gas recirculation device including a communication pipe by which an exhaust pipe of the engine and an intake pipe of the engine to communicating, and a valve that is provided in the communication pipe; and a control device configured to control the engine, to control the valve based on a target opening of the valve, to perform automatic stopping of the engine based on satisfaction of an automatic stopping condition, and to perform automatic starting of the engine based on satisfaction of an automatic starting condition. The control device is configured to prohibit automatic stopping of the engine when a catching diagnosis which is a diagnosis of whether foreign matter is caught in the valve is being performed.

According to the second aspect, when catching diagnosis is being performed, there is a likelihood that it will not be determined that foreign matter is not caught in the valve, that is, that foreign matter is caught in the valve, and thus automatic stopping of the engine is prohibited. Accordingly, it is possible to prevent the engine from failing to start automatically the next time due to automatic stopping of the engine in a state in which foreign matter is caught in the valve.

In the second aspect, the control device may be configured to permit automatic stopping of the engine when it is determined that foreign matter is not caught in the valve through the catching diagnosis within a predetermined time after start of the automatic stopping condition being satisfied.

In the above aspect, the control device may be configured to continue to prohibit automatic stopping of the engine when it has not been determined that foreign matter is not caught in the valve through the catching diagnosis within a predetermined time after satisfaction of the automatic stopping condition has been started.

In the above aspect, the vehicle may further include a pressure sensor that detects a pressure in the intake pipe as a detected intake air pressure. The control device may be configured to estimate the pressure in the intake pipe as an estimated intake air pressure and to perform the catching diagnosis by comparing an intake air pressure difference between the detected intake air pressure and the estimated intake air pressure with a threshold value when a diagnosis condition including an opening condition that the target opening becomes equal to or greater than a first predetermined opening and then becomes equal to or less than a second predetermined opening which is less than the first predetermined opening has been satisfied. Here, the "first predetermined opening" is set to an opening which is slightly greater than an opening corresponding to a minimum diameter of foreign matter which it is desired to detect when foreign matter is caught in the valve. Accordingly, when the diagnosis condition has been satisfied, it is possible to detect foreign matter which is caught in the valve by performing catching diagnosis. When the diagnosis condition has not been satisfied, it is possible to prevent foreign matter from being erroneously determined to be caught in the valve by not performing catching diagnosis.

In the above aspect, the diagnosis condition may further include an intake air pressure condition that the estimated intake air pressure is less than a predetermined pressure.

In the above aspect, the diagnosis condition may further include an intake air pressure condition that the detected intake air pressure is less than a predetermined pressure.

With these configurations, when the estimated intake air pressure or the detected intake air pressure is large (has a small negative pressure), it is thought that an amount of exhaust gas flowing in the communication pipe is less likely to increase and the intake air pressure difference is less likely to increase even when foreign matter is caught in the valve and the valve cannot be closed in response to a valve closing request. That is, it is thought that a difference in intake air pressure difference between when foreign matter is caught in the valve and when foreign matter is not caught in the valve is small. Accordingly, when the estimated intake air pressure or the detected intake air pressure is equal to or greater than a predetermined pressure, it is possible to better prevent foreign matter from being erroneously determined to be caught in the valve by determining that the diagnosis condition has not been satisfied and not performing the catching diagnosis.

In the aspect, the automatic starting condition may be satisfied after the automatic stopping condition has been satisfied.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the disclosure will be described with reference to the accompanying drawings.

Figure 1:
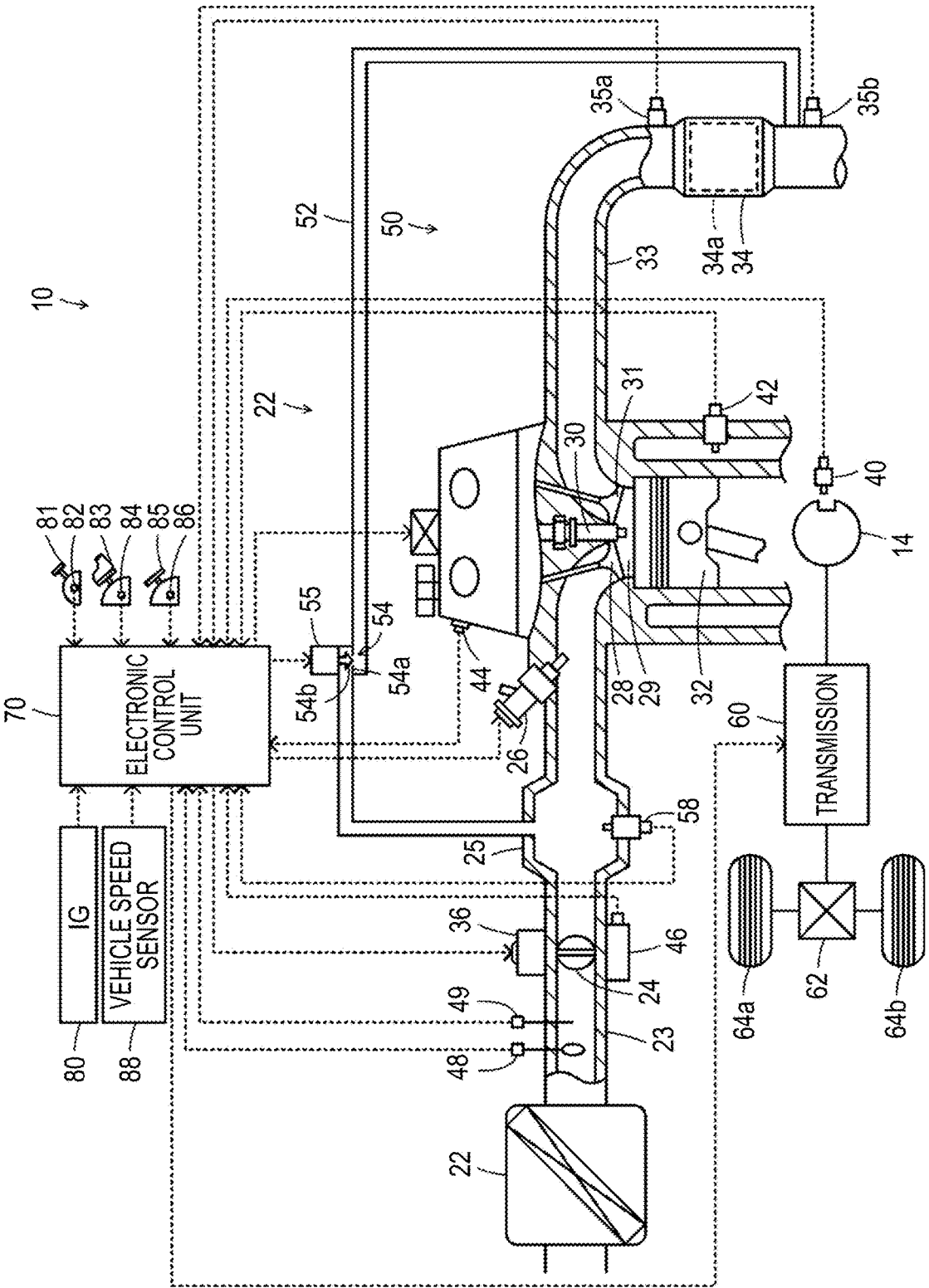
FIG. 1 is a diagram schematically illustrating a configuration of a vehicle 10 in which an engine unit is mounted according to the disclosure.

FIG. 1 is a diagram schematically illustrating a configuration of a vehicle 10 according to an embodiment of the disclosure. As illustrated in the drawing, the vehicle 10 according to an embodiment includes an engine 12, an exhaust gas recirculation device (hereinafter referred to as "EGR device") 50, a transmission 60 that is connected to a crankshaft 14 of the engine 12 and is connected to driving wheels 64a and 64b via a differential gear 62, and an electronic control unit 70 that controls the vehicle as a whole.

The engine 12 is configured as an internal combustion engine that outputs power using fuel such as gasoline or diesel. The engine 12 sucks air which is cleaned by an air cleaner 22 into an intake pipe 23, causes the air to flow sequentially through a throttle valve 24 and a surge tank 25, injects fuel from a fuel injection valve 26 downstream from the surge tank 25 in the intake pipe 23, and mixes the air and the fuel. Then, this air-fuel mixture is sucked into a combustion chamber 29 via an intake valve 28 and is exploded and combusted using sparks of an ignition plug 30. Then, a translational motion of a piston 32 which is pressed by energy based on the explosive combustion is converted into a rotational motion of a crankshaft 14. Exhaust gas which is discharged from the combustion chamber 29 to an exhaust pipe 33 via an exhaust valve 31 is discharged to outside air via an exhaust gas control device 34 including a catalyst (a three-way catalyst) 34a that removes harmful components such as carbon monoxide (CO), hydrocarbons (HC), or nitrogen oxides (NOx) and is supplied (recirculated) to the intake pipe 23 via the EGR device 50.

The EGR device 50 includes an EGR pipe 52 and an EGR valve 54. The EGR pipe 52 causes a downstream portion of the exhaust pipe 33 with respect to the exhaust gas control device 34 and the surge tank 25 of the intake pipe 23 to communicate with each other. The EGR valve 54 is provided in the EGR pipe 52 and includes a valve seat 54a and a valve member 54b. The valve seat 54a includes a hole with a diameter smaller than the inner diameter of the EGR pipe 52. The valve member 54b is driven by a stepping motor 55 and moves in an axial direction of the valve member 54b (an up-down direction in the drawing). The EGR valve 54 is closed by allowing the valve member 54b to move toward the valve seat 54a (to the lower side in the drawing) such that a tip (a lower end in the drawing) of the valve member 54b closes the hole of the valve seat 54a. The EGR valve 54 is opened by allowing the valve member 54b to move to a side which is separated from the valve seat 54a (the upper side in the drawing) such that the tip of the valve member 54b is separated from the valve seat 54a to open the hole of the valve seat 54a. The EGR device 50 adjusts an amount of exhaust gas recirculated in the exhaust pipe 33 and recirculates the exhaust gas to the intake pipe 23 by adjusting the opening of the EGR valve 54 using the stepping motor 55. The engine 12 can suck a mixture of air, exhaust gas, and fuel into the combustion chamber 29 in this way. In the following description, this recirculation of exhaust gas is referred to as "EGR" and an amount of recirculated exhaust gas is referred to as an "EGR volume."

The electronic control unit 70 is configured as a microprocessor including a CPU as a main component, and includes a ROM that stores a processing program, a RAM that temporarily stores data, and input and output ports in addition to the CPU. Signals from various sensors which are required for controlling the operation of the engine 12 are input to the electronic control unit 70 via the input port.

Examples of the signals which are input to the electronic control unit 70 include a crank angle θcr from a crank position sensor 40 that detects a rotational position of the crankshaft 14 of the engine 12 and a coolant temperature Tw from a coolant temperature sensor 42 that detects a temperature of a coolant of the engine 12. Examples of the signals also include cam angles θci and θco from a cam position sensor 44 that detects a rotational position of an intake cam shaft opening and closing the intake valve 28 and a rotational position of an exhaust cam shaft opening and closing the exhaust valve 31. Examples of the signals also include a throttle opening TH from a throttle position sensor 46 that detects a position of the throttle valve 24, an amount of intake air Qa from an air flowmeter 48 attached to the intake pipe 23, an intake air temperature Ta from a temperature sensor 49 attached to the intake pipe 23, and a detected intake air pressure Pind which is a detected value of a pressure in the surge tank 25 and which is supplied from a pressure sensor 57 attached to the surge tank 25. Examples of the signals also include an air-fuel ratio AF from an air-fuel ratio sensor 35a attached to the exhaust pipe 33 and an oxygen signal O2 from an oxygen sensor 35b attached to the exhaust pipe 33. Examples of the signals also include an ignition signal IG from an ignition switch 80 and a shift position SP from a shift position sensor 82 that detects an operation position of a shift lever 81. Examples thereof further include an accelerator operation amount Acc from an accelerator pedal position sensor 84 that detects an amount of depression of an accelerator pedal 83, a brake pedal position BP from a brake pedal position sensor 86 that detects an amount of depression of a brake pedal 85, and a vehicle speed V from a vehicle speed sensor 88.

Various control signals for controlling the operation of the engine 12 are output from the electronic control unit 70 via the output port. Examples of the signals which are output from the electronic control unit 70 include a control signal for a throttle motor 36 that adjusts the position of the throttle valve 24, a control signal for the fuel injection valve 26, a control signal for the ignition plug 30, and a control signal for the stepping motor 55 that adjusts the opening of the EGR valve 54. A control signal for the transmission 60 may also be output therefrom.

The electronic control unit 70 calculates a rotation speed Ne of the engine 12 based on the crank angle θcr from the crank position sensor 40. The electronic control unit 70 also calculates an estimated intake air pressure Pine which is an estimated value of the pressure in the surge tank 25 based on the amount of intake air Qa from the air flowmeter 48. Here, the estimated intake air pressure Pine can be calculated, for example, by applying the amount of intake air Qa to a relationship which is determined in advance through experiment or analysis between the amount of intake air Qa and the estimated intake air pressure Pine.

In the vehicle 10 according to this embodiment having the above-mentioned configuration, the electronic control unit 70 sets a target gear stage Gs* of the transmission 60 based on the accelerator operation amount Acc or the vehicle speed V and controls the transmission 60 such that a gear stage Gs of the transmission 60 reaches the target gear stage Gs*. The electronic control unit 70 sets a target torque Te* of the engine 12 based on the accelerator operation amount Acc, the vehicle speed V, or the gear stage Gs of the transmission 60 and performs operation control of the engine 12 (for example, control of the amount of intake air, fuel injection control, ignition control) or control of the EGR device 50 such that the engine 12 operates based on the target torque Te*.

In controlling the EGR device 50, when an EGR condition is satisfied, a target EGR volume Vegr* is set based on an operating point (the target torque Te* and the rotation speed Ne) of the engine 12 or the like, a target opening Ov* of the EGR valve 54 is set on the basis of the target EGR volume Vegr*, and the stepping motor 55 is controlled on the basis of the target opening Ov* of the EGR valve 54. On the other hand, when the EGR condition is not satisfied, the target opening Ov* of the EGR valve 54 is set to 0, and the stepping motor 55 is controlled based on the target opening Ov* of the EGR valve 54. As the EGR condition, a condition that warming-up of the engine 12 is completed, a condition that the target torque Te* of the engine 12 is in an EGR execution area, or the like is used.

Figure 2:
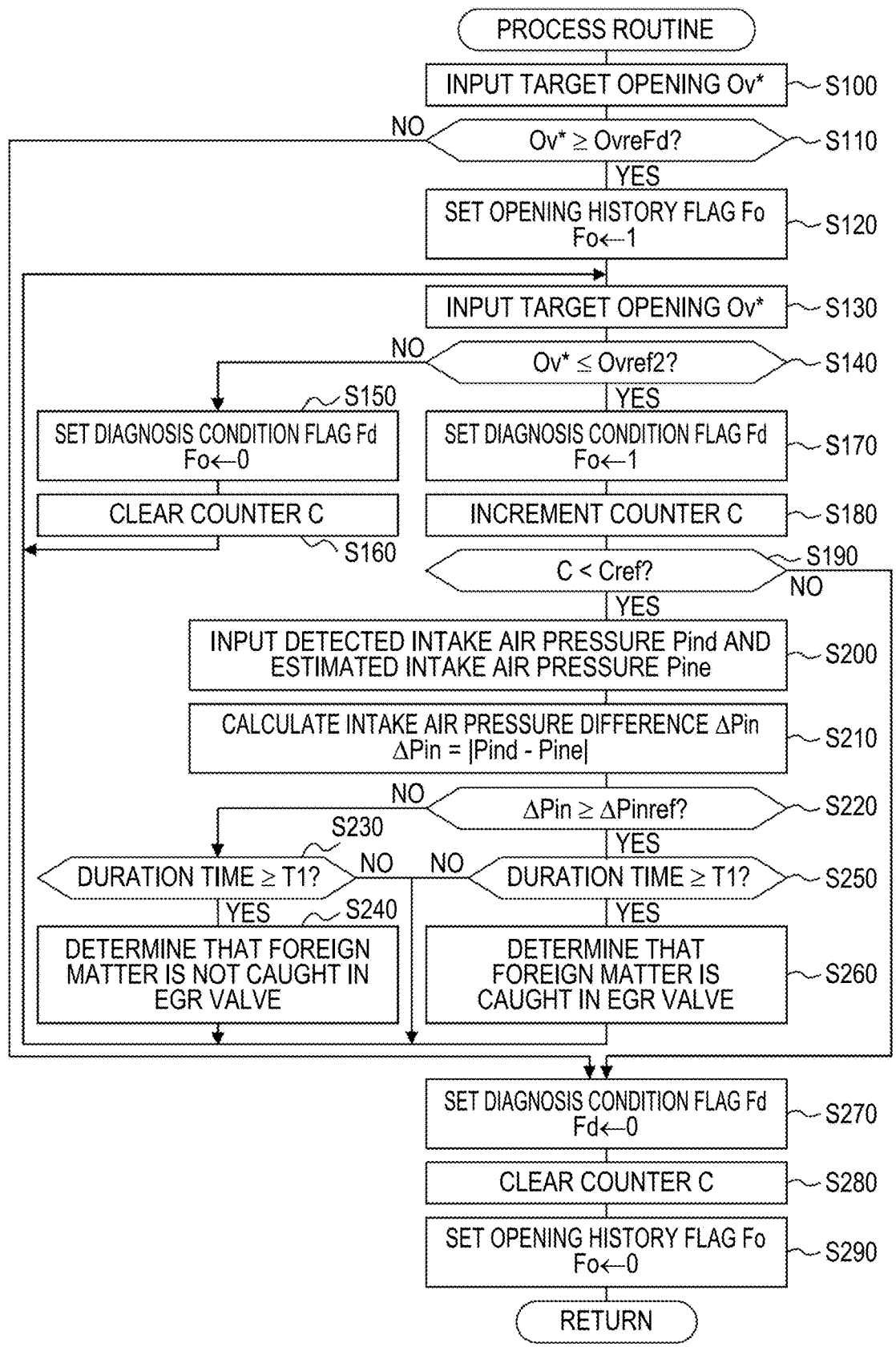
FIG. 2 is a flowchart illustrating an example of a process routine which is performed by an electronic control unit 70.

In the vehicle 10 according to this embodiment, the electronic control unit 70 performs catching diagnosis which is diagnosis of whether foreign matter is caught between the valve seat Ma and the valve member 54b of the EGR valve 54 by performing the process routine illustrated in FIG. 2. This routine is repeatedly performed when it has not been determined that foreign matter is caught in the EGR valve 54.

When the process routine illustrated in FIG. 2 is performed, the electronic control unit 70 first inputs the target opening Ov* of the EGR valve 54 (Step S100) and compares the input target opening Ov* of the EGR valve 54 with a threshold value Ovref1 (Step S110). Here, the threshold value Ovref1 is determined as an opening which is slightly greater than an opening corresponding to a minimum diameter of foreign matter which it is desired to detect when foreign matter is caught in the EGR valve 54 and, for example, an opening of about 15% to 30% is used.

When the target opening Ov* of the EGR valve 54 is less than the threshold value Ovref1 in Step S110, a diagnosis condition flag Fd is set to 0 (Step S270), the counter C is cleared to 0 (Step S280), an opening history flag Fo is set to 0 (Step S290), and then the process routine ends. Here, the diagnosis condition flag Fd indicates whether a diagnosis condition of catching diagnosis which will be described later is satisfied. The counter C indicates a value corresponding to a duration time of satisfaction of the diagnosis condition. The opening history flag Fo indicates whether the target opening Ov* of the EGR valve 54 has become equal to or greater than the threshold value Ovref1 in a history.

When the target opening Ov* of the EGR valve 54 is equal to or greater than the threshold value Ovref1 in Step S110, the opening history flag Fo is set to 1 (Step S120), the target opening Ov* of the EGR valve 54 is input (Step S130), and the input target opening Ov* of the EGR valve 54 is compared with a threshold value Ovref2 which is less than the threshold value Ovref1 (Step S140). Here, an opening in a range of 0% to a value slightly less than threshold value Ovref1 is used as the threshold value Ovref2.

In the embodiment, an opening change condition that the target opening Ov* of the EGR valve 54 becomes equal to or greater than the threshold value Ovref1 and then becomes equal to or less than the threshold value Ovref2 is used for the diagnosis condition of catching diagnosis. The reason therefor will be stated below. When it is determined that foreign matter is not caught in the EGR valve 54 through the previous catching diagnosis or when it has not yet been determined whether foreign matter is caught in the EGR valve 54 (for example, when the diagnosis condition has not been satisfied at all after foreign matter has been removed through execution of foreign matter removal control which will be described later), it is assumed, before the target opening Ov* of the EGR valve 54 reaches the threshold value Ovref1, that the likelihood that foreign matter will be caught between the valve seat 54a and the valve member 54b of the EGR valve 54 is sufficiently low and the likelihood that foreign matter has been caught between the valve seat 54a and the valve member 54b is sufficiently low. On the other hand, when an opening change condition is satisfied and it is intended to decrease the opening of the EGR valve 54 (for example, to close the valve), it is thought there is a likelihood that foreign matter will be caught between the valve seat 54a and the valve member 54b of the EGR valve 54. In the embodiment, the processes of Steps S110 and S140 are performed in consideration thereof.

When the target opening Ov* of the EGR valve 54 is greater than the threshold value Ovref2 in Step S140, it is determined that the diagnosis condition has not been satisfied, the diagnosis condition flag Fd is set to 0 (Step S150), the counter C is cleared to 0 (Step S160), and the process routine returns to Step S130.

When the target opening Ov* of the EGR valve 54 is equal to or less than the threshold value Ovref2 in Step S140, it is determined that the diagnosis condition has been satisfied, the diagnosis condition flag Fd is set to 1 (Step S170), the counter C is incremented by 1 (Step S180), and the counter C is compared with a threshold value Cref (Step S190). Here, the threshold value Cref is determined to be a value corresponding to the diagnosis time of the catching diagnosis and, for example, a value corresponding to several hundreds of msec to 1 sec is used.

When the counter C is less than the threshold value Cref in Step S190, a detected intake air pressure Pind from the pressure sensor 57 and an estimated intake air pressure Pine estimated by the electronic control unit 70 are input (Step S200). Subsequently, an intake air pressure difference ΔPin (=|Pind−Pine|) which is a difference between the detected intake air pressure Pind and the estimated intake air pressure Pine is calculated (Step S210) and the calculated intake air pressure difference ΔPin is compared with a threshold value ΔPinref (Step S220). Here, the threshold value ΔPinref is a threshold value which is used to determine whether foreign matter is caught in the EGR valve 54 and is determined in advance by experiment or analysis.

When the intake air pressure difference ΔPin is less than the threshold value ΔPinref in Step S220, a duration time thereof (hereinafter referred to as a "difference-small duration time") is compared with a determination time T1 (Step S230). Here, the determination time T1 is a time required to determine whether foreign matter is caught in the EGR valve 54 and is set to a time which is slightly shorter than a diagnosis time of the catching diagnosis (a time corresponding to the threshold value Cref). When the difference-small duration time is less than the determination time T1, it is not determined that foreign matter is not caught in the EGR valve 54 and the process routine returns to Step S130. When the difference-small duration time is equal to or greater than the determination time T1, it is determined that foreign matter is not caught in the EGR valve 54 (Step S240) and the process routine returns to Step S130.

When the intake air pressure difference ΔPin is equal to or greater than the threshold value ΔPinref in Step S220, a duration time thereof (hereinafter referred to as a difference-large duration time) is compared with the determination time T1 (Step S250). When the difference-large duration time is less than the determination time T1, it is not determined that foreign matter is caught in the EGR valve 54 and the process routine returns to Step S130. When the difference-large duration time is equal to or greater than the determination time T1, it is determined that foreign matter is caught in the EGR valve 54 (Step S260) and the process routine returns to Step S130.

When it is determined that foreign matter is caught in the EGR valve 54, information thereof may be stored in a nonvolatile memory which is not illustrated or a driver may be notified by turning on an alarm lamp which is not illustrated, outputting voice from a speaker which is not illustrated, or the like. When it is determined that foreign matter is caught in the EGR valve 54, foreign matter removal control for opening and closing the EGR valve 54 at an appropriate time by a predetermined number of times or for a predetermined time is then preferably performed to remove foreign matter. When foreign matter is removed in this way, determination indicating that foreign matter is caught in the EGR valve 54 is released and repeated execution of the process routine is restarted.

When the opening change condition is satisfied in this way, it is possible to detect that foreign matter is caught in the EGR valve 54 by performing the catching diagnosis. On the other hand, when the opening change condition is not satisfied, it is possible to prevent erroneous detection (erroneous determination) indicating that foreign matter is caught in the EGR valve 54 by not performing the catching diagnosis.

The significance of not performing catching diagnosis when the opening change condition is not satisfied is greater when a high flow-rate EGR device with a large diameter of the EGR pipe 52 is used as the EGR device 50 than when a low flow-rate EGR device with a small diameter of the EGR pipe 52 is used. In the former, the size of foreign matter which does not cause a problem even when foreign matter is caught in the EGR valve 54 (of which catching is allowable) is smaller than in the latter. This is because, when the EGR valve 54 cannot be closed due to catching of foreign matter therein in response to a closing request for the EGR valve 54, an unintentional EGR volume is greater in the former than in the latter and something such as a misfire or a stall can be easily caused in the engine 12. Accordingly, when a high flow-rate EGR device is used, it is preferable to decrease the threshold value ΔPinref, but this is likely to cause erroneous detection (erroneous determining) that foreign matter is caught in the EGR valve 54. For this reason, when a high flow-rate EGR device is used, the significance of not performing catching diagnosis when the opening change condition is not satisfied is greater.

In this way, the processes of Steps S130, S140, and S170 to S240 or the processes of Steps S130, S140, S170 to S220, S250, and S260 are repeatedly performed, it is determined that the catching diagnosis ends and the diagnosis condition flag Fd is set to 0 when the counter C reaches the threshold value Cref or more in Step S190 (Step S270), the counter C is cleared to 0 (Step S280), the opening history flag Fo is set to 0 (Step S290), and the process routine ends.

Figure 3:
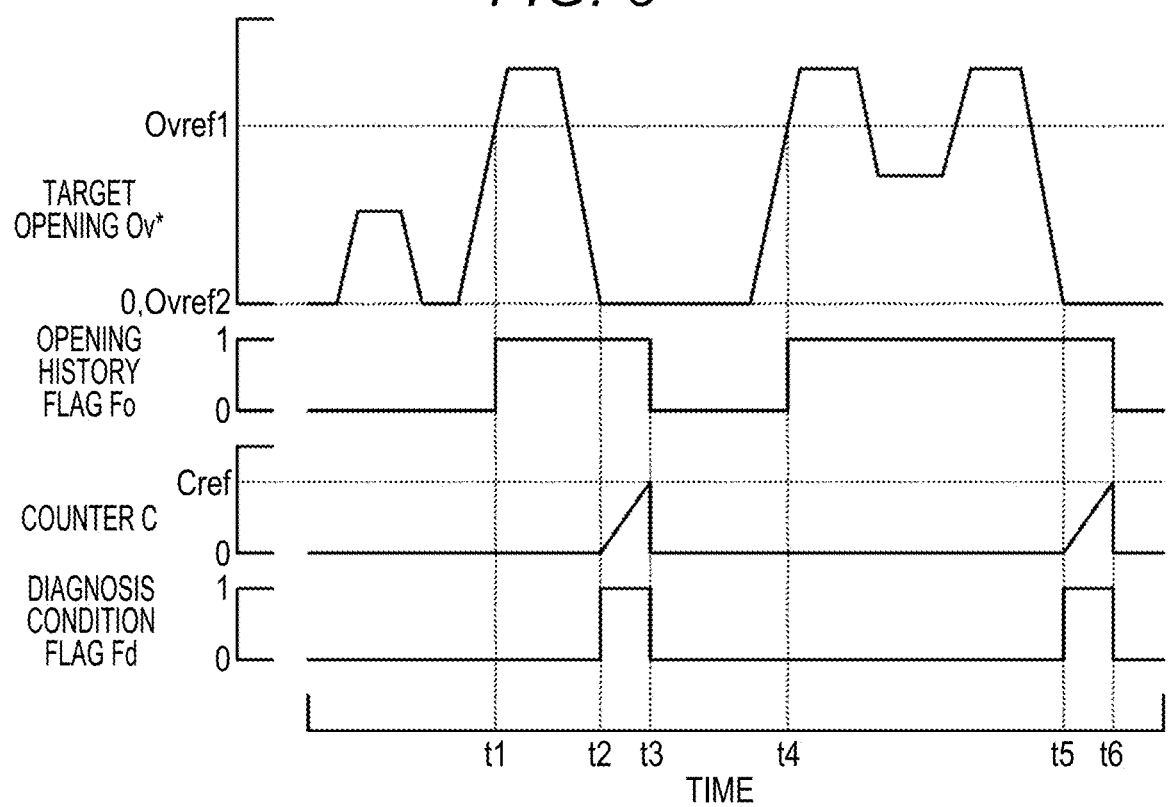
FIG. 3 is a diagram illustrating an example of a target opening Ov* of an EGR valve 54, an opening history flag Fo, a counter C, and a diagnosis condition flag Fd.

FIG. 3 is a diagram illustrating an example of the target opening Ov* of the EGR valve 54, the opening history flag Fo, the counter C, and the diagnosis condition flag Fd. In FIG. 3, an example in which 0 is used as the threshold value Ovref2 is illustrated. As described in the drawing, when the opening history flag Fo is 0 and the target opening Ov* of the EGR valve 54 becomes equal to or less than the threshold value Ovref1 (times t1 and t4), the opening history flag Fo is switched to 1. Thereafter, when the target opening Ov* of the EGR valve 54 becomes equal to or less than the threshold value Ovref2 (times t2 and t5), the diagnosis condition flag Fd is switched from 0 to 1, incrementing of the counter C is started, and the catching diagnosis is started. Then, when the counter C becomes equal to or greater than the threshold value Cref (times t3 and t6), the catching diagnosis ends, the diagnosis condition flag Fd is switched to 0, the counter C is cleared to 0, and the opening history flag Fo is switched to 0.

In the vehicle 10 according to the embodiment, the electronic control unit 70 performs automatic stopping of the engine 12 based on satisfaction of an automatic stopping condition and performs automatic starting of the engine 12 based on satisfaction of an automatic starting condition. As the automatic stopping condition, a condition that the vehicle speed V is zero or equal to or less than a value slightly greater than zero, a condition that a brake pedal 85 is depressed, or the like is used. In the automatic stopping of the engine 12, the target opening Ov* of the EGR valve 54 is set to zero to control the EGR valve 54 while the engine 12 is idling, and then operation control of the engine 12 (intake air amount control, fuel injection control, ignition control, or the like) is stopped. Accordingly, when foreign matter is not caught in the EGR valve 54, the EGR valve 54 is closed. A condition that depression of the brake pedal 85 is released or the like is used for the automatic starting condition. In the starting of the engine 12, the engine 12 is cranked by a starter which is not illustrated and the operation control of the engine 12 is started. A part associated with the automatic stopping of the engine 12 will be described below.

Figure 4:
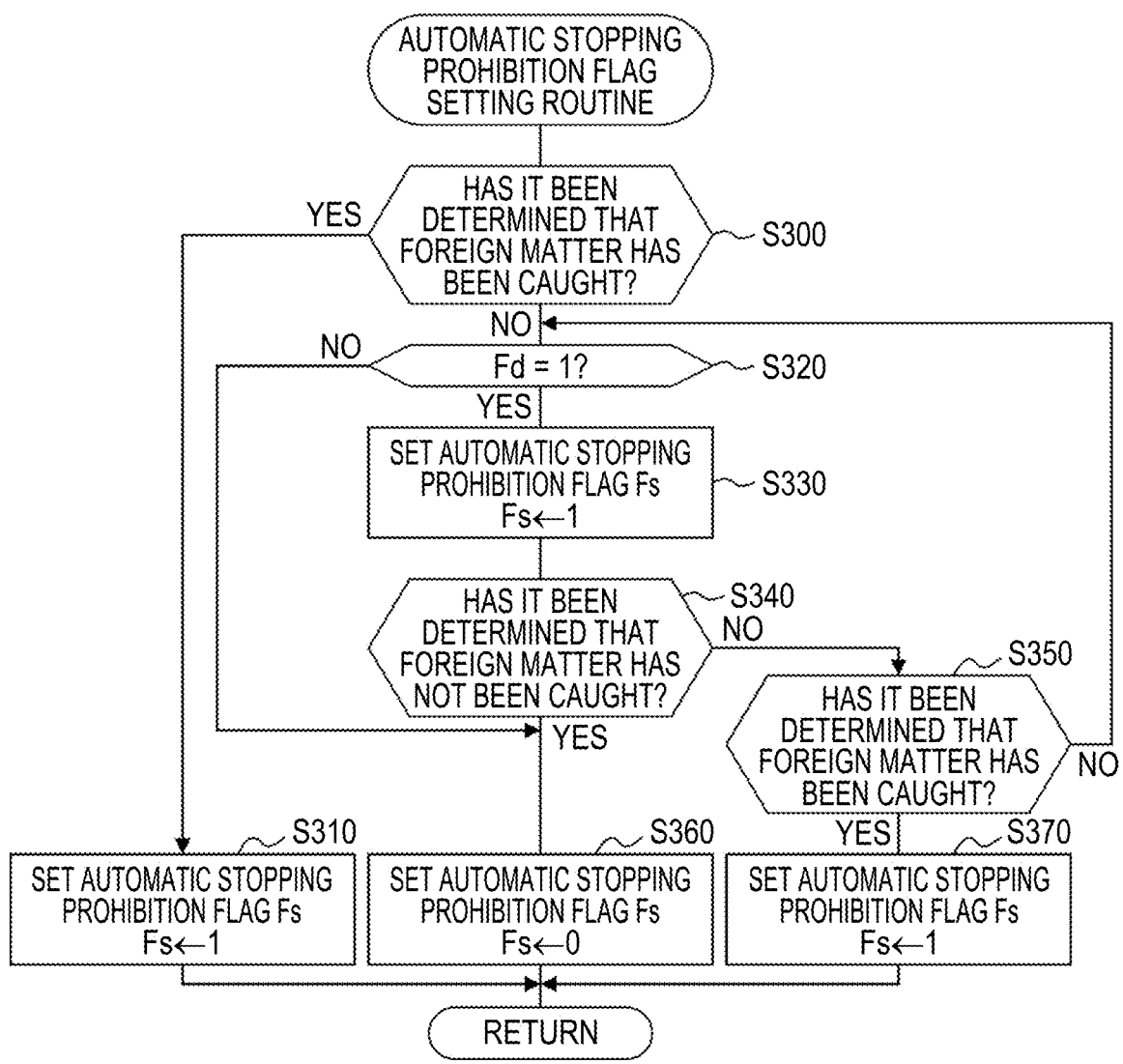
FIG. 4 is a flowchart illustrating an example of an automatic stopping prohibition flag setting routine which is performed by the electronic control unit 70.
Figure 5:
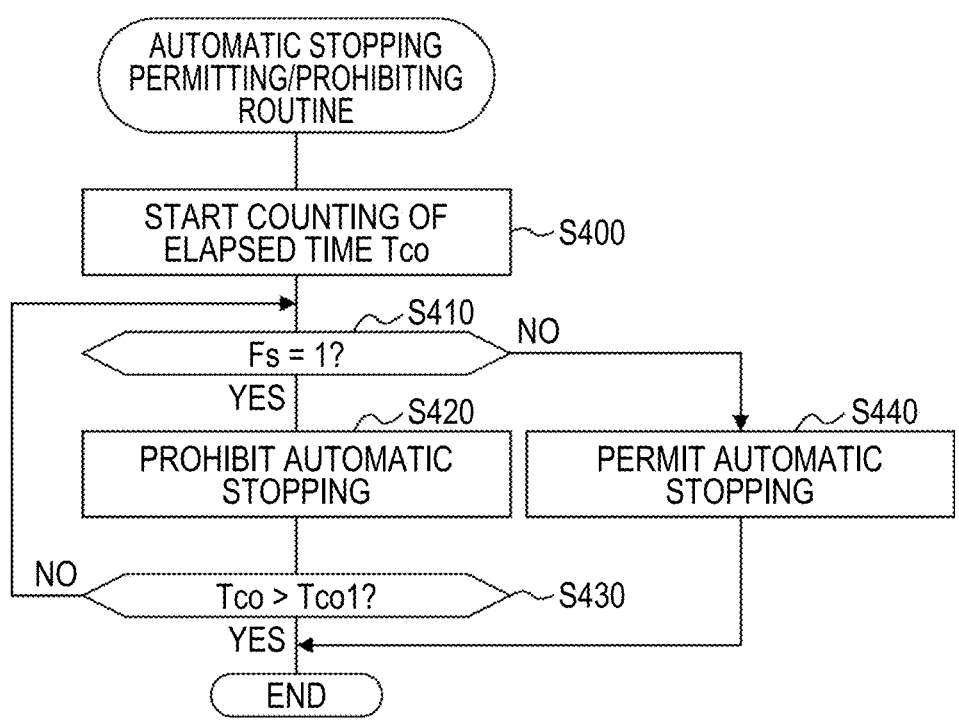
FIG. 5 is a flowchart illustrating an example of an automatic stopping permitting/prohibiting routine which is performed by the electronic control unit 70.

FIG. 4 is a flowchart illustrating an example of an automatic stopping prohibition flag setting routine which is performed by the electronic control unit 70. FIG. 5 is a flowchart illustrating an example of an automatic stop permitting/prohibiting routine which is performed by the electronic control unit 70. The routine illustrated in FIG. 4 and the routine illustrated in FIG. 5 will be sequentially described below.

The automatic stopping prohibition flag setting routine illustrated in FIG. 4 will be described. This routine is repeatedly performed. When this routine is performed, the electronic control unit 70 first determines whether it has been determined that foreign matter is caught in the EGR valve 54 through the process routine illustrated in FIG. 2 (Step S300). When it is determined that foreign matter is caught in the EGR valve 54, an automatic stopping prohibition flag Fs is set to 1 (Step S310) and the routine ends. Details of the automatic stopping prohibition flag Fs will be described later.

When it has not been determined that foreign matter is caught in the EGR valve 54 in Step S300, the value of the diagnosis condition flag Fd which is set through the process routine illustrated in FIG. 2 is checked (Step S320). When the diagnosis condition flag Fd is 0, it is determined that the diagnosis condition has not been satisfied, the automatic stopping prohibition flag Fs is set to 0 (Step S360), and the routine ends. Examples of the case in which it has not been determined that foreign matter is caught in the EGR valve 54 and the diagnosis condition has not been satisfied include a case in which the diagnosis condition has not been newly satisfied after it has been determined that foreign matter is not caught in the EGR valve 54 in the previous catching diagnosis and a case in which it has not yet been determined whether foreign matter is caught in the EGR valve 54 (a case in which the diagnosis condition has not been newly satisfied after foreign matter has been removed by performing the foreign matter removal control or the like). At this time, as described above, it is assumed that the likelihood that foreign matter is caught between the valve seat 54a and the valve member 54b of the EGR valve 54 is sufficiently low.

When the diagnosis condition flag Fd is set to 1 in Step S320, it is determined that the diagnosis condition has been satisfied and the automatic stopping prohibition flag Fs is set to 1 (Step S330). Then, it is determined whether it has been determined whether foreign matter is caught in the EGR valve 54 through the process routine illustrated in FIG. 2 (Steps S340 and S350). When it has not been determined whether foreign matter is caught in the EGR valve 54, the routine returns to Step S320. Accordingly, when the diagnosis condition has been satisfied, the catching diagnosis is performed, and it has not been determined whether foreign matter is caught in the EGR valve 54, the automatic stopping prohibition flag Fs is maintained at the value of 1.

When it is determined in Step S340 that foreign matter is not caught in the EGR valve 54, the automatic stopping prohibition flag Fs is set to 0 (Step S360) and the routine ends. When it is determined in Step S350 that foreign matter is caught in the EGR valve 54, the automatic stopping prohibition flag Fs is set to 1 (Step S370) and the routine ends.

The automatic stop permitting/prohibiting routine illustrated in FIG. 5 will be described below. This routine is performed when the automatic stopping condition has been satisfied. When this routine is performed, the electronic control unit 70 first starts counting of an elapsed time Tco after execution of the routine has been started (satisfaction of the automatic stopping condition has been started) (Step S400). Subsequently, the electronic control unit 70 checks the value of the automatic stopping prohibition flag Fs which is set through the automatic stopping prohibition flag setting routine illustrated in FIG. 4 (Step S410).

When the automatic stopping prohibition flag Fs is set to 0 in Step S410, automatic stopping of the engine 12 is permitted (Step S440) and the routine ends. When the automatic stopping of the engine 12 is permitted, the electronic control unit 70 performs the automatic stopping of the engine 12. When it is determined that foreign matter is not caught in the EGR valve 54 through the process routine illustrated in FIG. 2, the automatic stopping prohibition flag Fs is set to 0 through the automatic stopping prohibition flag setting routine illustrated in FIG. 4. Accordingly, when the automatic stopping condition has been satisfied and it is determined that foreign matter is not caught in the EGR valve 54, the automatic stopping of the engine 12 is immediately performed.

When the value of the automatic stopping prohibition flag Fs is 1 in Step S410, the automatic stopping of the engine 12 is prohibited (Step S420). When the automatic stopping of the engine 12 is prohibited, the electronic control unit 70 continues to perform the operation control of the engine 12. Since the case in which the automatic stopping condition has been satisfied is considered, for example, the engine 12 is caused to idle at an idling rotation speed (to operate without a load).

Subsequently, the elapsed time Tco is compared with a predetermined time Tco1 (Step S430). For example, about several seconds is used as the predetermined time Tco1. When the elapsed time Tco is equal to or less than the predetermined time Tco1, the routine returns to Step S410. When the processes of Steps S410 to S430 are being repeatedly performed in this way and it is determined in Step S410 that the automatic stopping prohibition flag Fs is 0, the automatic stopping of the engine 12 is permitted (Step S440) and the routine ends. On the other hand, when the processes of Steps S410 to S430 are being repeatedly performed and the elapsed time Tco is greater than the predetermined time Tco1 in Step S430, the routine ends without permitting the automatic stopping of the engine 12.

When it is determined that foreign matter is caught in the EGR valve 54 through the process routine illustrated in FIG. 2 or when the diagnosis condition has been satisfied and it has not been determined whether foreign matter is caught in the EGR valve 54, the automatic stopping prohibition flag Fs is set to 1 through the automatic stopping prohibition flag setting routine illustrated in FIG. 4. Accordingly, when automatic stopping condition has been satisfied and it is determined that foreign matter is caught in the EGR valve 54 or when the diagnosis condition has been satisfied and it has not been determined whether foreign matter is caught in the EGR valve 54, the automatic stopping of the engine 12 is prohibited. Then, when it is determined that foreign matter is not caught in the EGR valve 54 through the process routine illustrated in FIG. 2 and the automatic stopping prohibition flag Fs is set to 0 through the automatic stopping prohibition flag setting routine illustrated in FIG. 4 within the predetermined time Tco1 after satisfaction of the automatic stopping condition has been started, the automatic stopping of the engine 12 is performed. When the automatic stopping prohibition flag Fs is not set to 0 through the automatic stopping prohibition flag setting routine illustrated in FIG. 4 within the predetermined time Tco1 after satisfaction of the automatic stopping condition has been started, the automatic stopping of the engine 12 continues to be prohibited.

When the engine 12 is automatically stopped in a state in which foreign matter is caught in the EGR valve 54 and then the engine 12 is automatically started, unintentional EGR is performed, combustion of the engine 12 may not be stabilized, and there is a likelihood that the engine 12 will fail to start. In consideration of this, in the embodiment, it is assumed that the automatic stopping of the engine 12 is prohibited when it is determined that foreign matter is caught in the EGR valve 54 or when the diagnosis condition has been satisfied and it has not been determined whether foreign matter is caught in the EGR valve 54. Accordingly, it is possible to prevent a problem that the engine 12 is automatically stopped in a state in which foreign matter is caught in the EGR valve 54 and the engine 12 fails to start the next time.

In the vehicle 10 according to the embodiment described above, when it is determined that foreign matter is caught in the EGR valve 54 or when the diagnosis condition has been satisfied, the catching diagnosis is performed, and it is not determined whether foreign matter is caught in the EGR valve 54, the electronic control unit 70 prohibits the automatic stopping of the engine 12. Accordingly, it is possible to prevent a problem in that the engine 12 is automatically stopped in a state in which foreign matter is caught in the EGR valve 54 and the engine 12 fails to start the next time.

In the vehicle 10 according to the embodiment, when it is determined that foreign matter is caught in the EGR valve 54 or when the diagnosis condition has been satisfied, the catching diagnosis is performed, and it is not determined whether foreign matter is caught in the EGR valve 54, the automatic stopping of the engine 12 is prohibited. However, the automatic stopping of the engine 12 may be prohibited when it is determined that foreign matter is caught in the EGR valve 54, and the automatic stopping of the engine 12 may not be prohibited when the diagnosis condition has been satisfied, the catching diagnosis is performed, and it has not been determined that foreign matter is caught in the EGR valve 54.

In the vehicle 10 according to the embodiment, when the catching diagnosis is being performed and the counter C becomes equal to or greater than the threshold value Cref, the electronic control unit 70 ends the catching diagnosis. However, when the counter C is less than the threshold value Cref and it is determined whether foreign matter is caught in the EGR valve 54, the catching diagnosis may be ended and the diagnosis condition flag Fd may be set to 0.

Figure 6:
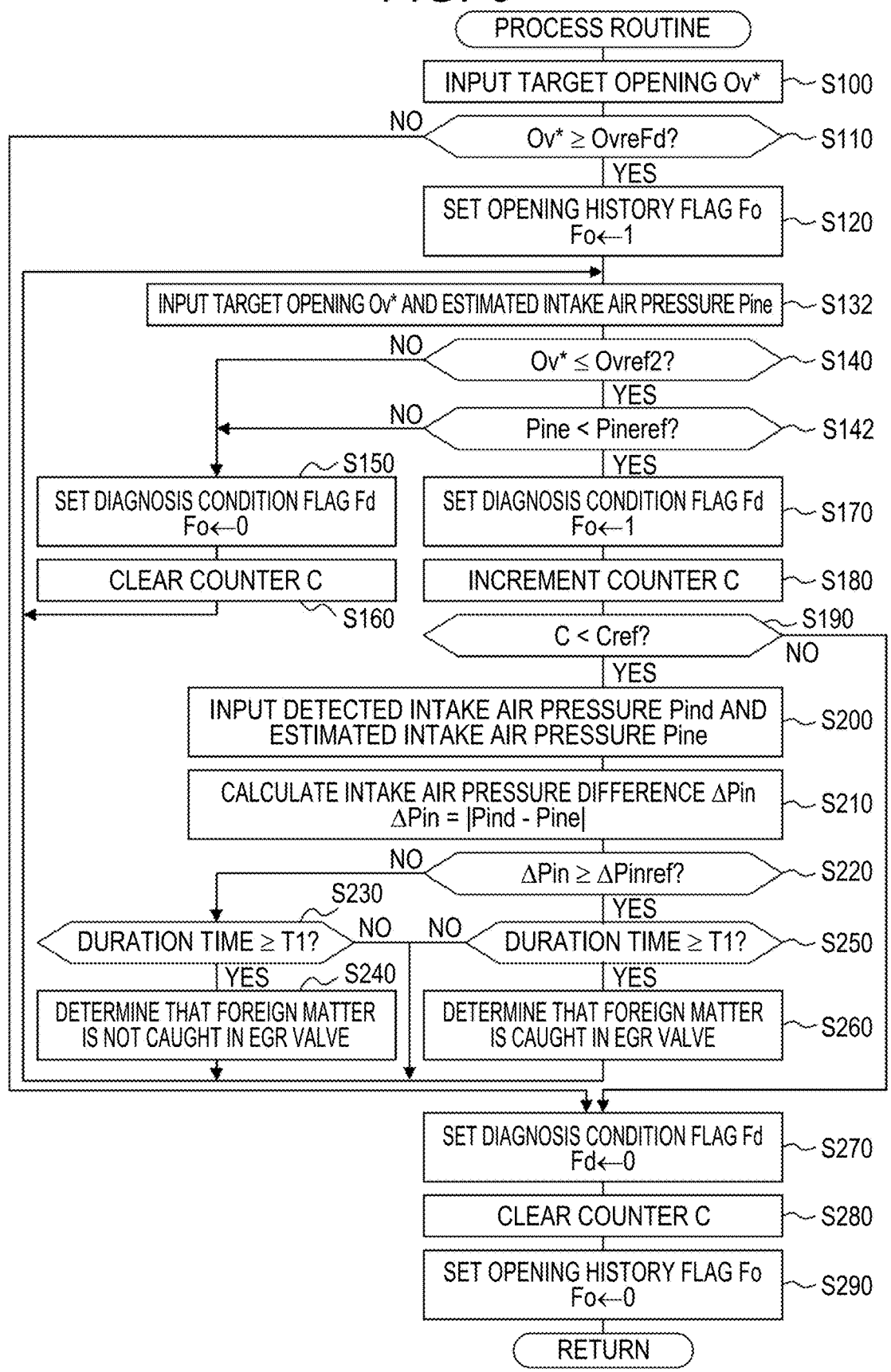
FIG. 6 is a flowchart illustrating an example of a process routine according to a modified example.
Figure 7:
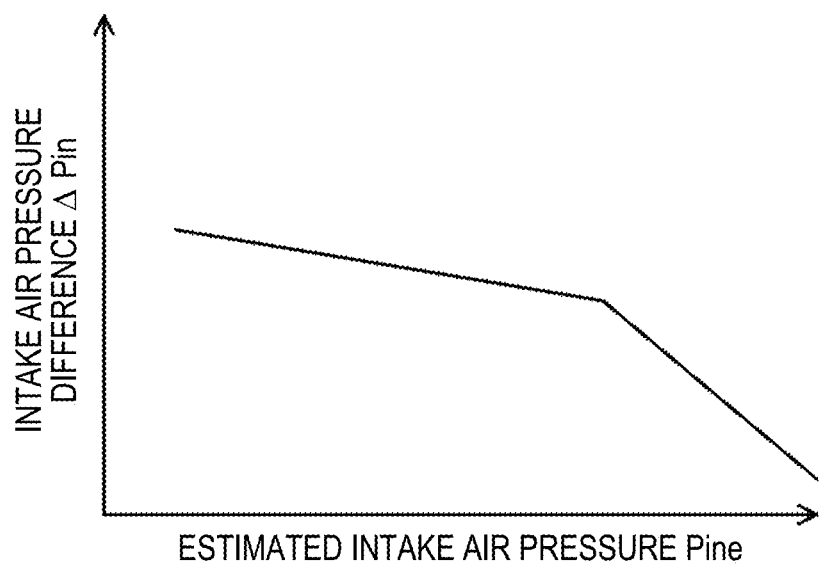
FIG. 7 is a diagram illustrating an example of a relationship between an estimated intake air pressure Pine and an intake air pressure difference ΔPin when an engine 12 is rotating at a certain rotation speed and foreign matter is caught in the EGR valve 54.

In the vehicle 10 according to the embodiment, the electronic control unit 70 performs the process routine illustrated in FIG. 2. However, instead, the process routine illustrated in FIG. 6 may be performed. The process routine illustrated in FIG. 6 is the same as the process routine illustrated in FIG. 2, except that the process of Step S130 is replaced with the process of Step S132 and the process of Step S142 is added. Accordingly, processes the same in the process routine illustrated in FIG. 6 as in the process routine illustrated in FIG. 2 will be referred to by the same step numbers and detailed description thereof will be omitted.

In the process routine illustrated in FIG. 6, when the opening history flag Fo is set to 1 in Step S120, the electronic control unit 70 receives an estimated intake air pressure Pine in addition to the target opening Ov* of the EGR valve 54 (Step S132). Then, the electronic control unit 70 compares the target opening Ov* of the EGR valve 54 with the threshold value Ovref2 (Step S140), and compares the estimated intake air pressure Pine with a threshold value Pineref (Step S142). For example, several tens of kPa is used as the threshold value Pineref. In this modified example, an intake air pressure condition that the estimated intake air pressure Pine is less than the threshold value Pineref in addition to the opening change condition is used for the diagnosis condition of the catching diagnosis. The reason therefor will be stated later.

When the target opening Ov* of the EGR valve 54 is greater than the threshold value Ovref2 in Step S140 or when the estimated intake air pressure Pine is equal to or greater than the threshold value Pineref in Step S142, it is determined that the diagnosis condition has not been satisfied and the processes of Step S150 and steps subsequent thereto are performed.

When the target opening Ov* of the EGR valve 54 is equal to or less than the threshold value Ovref2 in Step S140 and the estimated intake air pressure Pine is less than the threshold value Pineref in Step S142, it is determined that the diagnosis condition has been satisfied and the processes of Step S170 and steps subsequent thereto are performed.

The reason why the intake air pressure condition in addition to the opening change condition is used for the diagnosis condition will be described below. FIG. 5 is a diagram illustrating an example of a relationship between the estimated intake air pressure Pine and the intake air pressure difference ΔPin when the engine 12 is rotating at a certain rotation speed and foreign matter is caught in the EGR valve 54. This relationship was acquired in advance through experiment or analysis by the inventors. It can be seen from FIG. 5 that the intake air pressure difference ΔPin (=|Pind−Pine|) decreases as the estimated intake air pressure Pine increases. This is because an unintentional EGR volume is less likely to increase and the intake air pressure difference ΔPin is less likely to increase when the estimated intake air pressure Pine is high (low as a negative pressure) and the EGR valve 54 cannot be closed due to catching of foreign matter therein in response to a closing request for the EGR valve 54. When the intake air pressure difference ΔPin between when foreign matter is not caught in the EGR valve 54 and when foreign matter is caught in the EGR valve 54 is small, it is easy to erroneously detect (erroneously determine) that foreign matter is caught in the EGR valve 54. In consideration thereof, in the modified example, the intake air pressure condition in addition to the opening change condition is used as the diagnosis condition. Accordingly, it is possible to better prevent erroneous detection (erroneous determination) indicating that foreign matter is caught in the EGR valve 54.

In the modified example, the opening change condition and the intake air pressure condition that the estimated intake air pressure Pine is less than the threshold value Pineref are used as the diagnosis condition of the catching diagnosis. However, in the intake air pressure condition, the detected intake air pressure Pind may be used instead of the estimated intake air pressure Pine.

In the vehicle 10 according to the embodiment or the modified example, as the diagnosis condition of the catching diagnosis, the opening change condition is used or the opening change condition and the intake air pressure condition are used. However, as the diagnosis condition, for example, a condition that EGR conditions are not satisfied because the accelerator pedal 83 is greatly depressed (for example, the accelerator operation amount Acc becomes 100%) during satisfaction of the EGR conditions and the target torque Te* of the engine 12 is greater than the upper limit of the EGR execution area or a condition that EGR conditions are not satisfied because the accelerator pedal is turned off during satisfaction of the EGR conditions and the target torque Te* of the engine 12 is less than the lower limit of the EGR execution area may be used instead.

The correspondence between principal elements in the embodiment and principal elements in the SUMMARY will be described below. In the embodiment, the engine 12 is an example of an "engine," the EGR device 50 is an example of an "exhaust gas recirculation device," the EGR pipe 52 is an example of a "communication pipe," and the electronic control unit 70 is an example of a "control device."

The correspondence between the principal elements in the embodiment and the principal elements in the SUMMARY does not limit the elements of the SUMMARY, because the embodiment is an example for specifically describing the aspects in the SUMMARY. That is, it should be noted that the disclosure described in the SUMMARY have to be construed based on the description thereof and the embodiment is only a specific example of the disclosure in the SUMMARY.

While an embodiment of the disclosure has been described above, the disclosure is not limited to the embodiment and can be modified in various forms without departing from the gist of the disclosure.

The disclosure is applicable to manufacturing industries for vehicles.

What is claimed is:

1. A vehicle comprising:
   an engine;
   an exhaust gas recirculation device including, a communication pipe by which an exhaust pipe of the engine and an intake pipe of the engine communicating, and a valve that is provided in the communication pipe; and
   a control device configured to control the engine, to control the valve based on a target opening of the valve, to perform automatic stopping of the engine based on satisfaction of an automatic stopping condition, and to perform automatic starting of the engine based on satisfaction of an automatic starting condition,
   wherein the control device is configured to prohibit automatic stopping of the engine when it is determined that foreign matter is caught in the valve through a catching diagnosis which is a diagnosis of whether foreign matter is caught in the valve.

2. A vehicle comprising:
   an engine;
   an exhaust gas recirculation device including, a communication pipe by which an exhaust pipe of the engine and an intake pipe of the engine communicating, and a valve that is provided in the communication pipe; and
   a control device configured to control the engine, to control the valve based on a target opening of the valve, to perform automatic stopping of the engine based on satisfaction of an automatic stopping condition, and to perform automatic starting of the engine based on satisfaction of an automatic starting condition,
   wherein the control device is configured to prohibit automatic stopping of the engine when a catching diagnosis which is a diagnosis of whether foreign matter is caught in the valve is being performed.

3. The vehicle according to claim 2, wherein the control device is configured to permit automatic stopping of the engine when it is determined that foreign matter is not caught in the valve through the catching diagnosis within a predetermined time after start of the automatic stopping condition being satisfied.

4. The vehicle according to claim 3, wherein the control device is configured to continue to prohibit automatic stopping of the engine when it has not been determined that foreign matter is not caught in the valve through the catching diagnosis within a predetermined time after start of the automatic stopping condition being satisfied.

5. The vehicle according to claim 1, further comprising a pressure sensor that detects a pressure in the intake pipe as a detected intake air pressure,
   wherein the control device is configured to estimate the pressure in the intake pipe as an estimated intake air pressure and to perform the catching diagnosis by comparing an intake air pressure difference between the detected intake air pressure and the estimated intake air pressure with a threshold value when a diagnosis condition including an opening condition that the target opening becomes equal to or greater than a first predetermined opening and then becomes equal to or less than a second predetermined opening which is less than the first predetermined opening has been satisfied.

6. The vehicle according to claim 2, further comprising a pressure sensor that detects a pressure in the intake pipe as a detected intake air pressure,
   wherein the control device is configured to estimate the pressure in the intake pipe as an estimated intake air pressure and to perform the catching diagnosis by comparing an intake air pressure difference between the detected intake air pressure and the estimated intake air pressure with a threshold value when a diagnosis condition including an opening condition that the target opening becomes equal to or greater than a first predetermined opening and then becomes equal to or less than a second predetermined opening which is less than the first predetermined opening has been satisfied.

7. The vehicle according to claim 5, wherein the diagnosis condition further includes an intake air pressure condition that the estimated intake air pressure is less than a predetermined pressure.

8. The vehicle according to claim 5, wherein the diagnosis condition further includes an intake air pressure condition that the detected intake air pressure is less than a predetermined pressure.

9. The vehicle according to claim 6, wherein the diagnosis condition further includes an intake air pressure condition that the estimated intake air pressure is less than a predetermined pressure.

10. The vehicle according to claim 6, wherein the diagnosis condition further includes an intake air pressure condition that the detected intake air pressure is less than a predetermined pressure.

11. The vehicle according to claim 1, wherein the automatic starting condition is satisfied after the automatic stopping condition has been satisfied.

12. The vehicle according to claim 2, wherein the automatic starting condition is satisfied after the automatic stopping condition has been satisfied.

* * * * *